(12) United States Patent
Raju et al.

(10) Patent No.: US 10,719,310 B1
(45) Date of Patent: Jul. 21, 2020

(54) SYSTEMS AND METHODS FOR REDUCING KEYBOARD, VIDEO, AND MOUSE (KVM) DOWNTIME DURING FIRMWARE UPDATE OR FAILOVER EVENTS IN A CHASSIS WITH REDUNDANT ENCLOSURE CONTROLLERS (ECS)

(71) Applicant: Dell Products, L.P., Round Rock, TX (US)

(72) Inventors: Senthil Kumar Raju, Bangalore (IN); Rajeshkumar Ichchhubhai Patel, Bangalore (IN); Sundar Shanmugam, Madurai (IN); Rajkumar Nagarajan, Banaglore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/355,977

(22) Filed: Mar. 18, 2019

(51) Int. Cl.
*G06F 9/44* (2018.01)
*G06F 8/656* (2018.01)
*G06F 9/4401* (2018.01)
*G06F 13/12* (2006.01)

(52) U.S. Cl.
CPC ............ *G06F 8/656* (2018.02); *G06F 9/4411* (2013.01); *G06F 13/126* (2013.01)

(58) Field of Classification Search
None
See application file for complete search history.

(56) References Cited

U.S. PATENT DOCUMENTS

| | | | | |
|---|---|---|---|---|
| 8,881,132 B2* | 11/2014 | Mopur | .................. | G06F 3/0617 709/221 |
| 2008/0126778 A1* | 5/2008 | Bishop | ....................... | G06F 8/65 713/2 |
| 2009/0210867 A1* | 8/2009 | Suzuki | ....................... | G06F 8/65 717/168 |
| 2010/0229166 A1* | 9/2010 | Mopur | .................. | G06F 3/0617 717/168 |
| 2011/0072254 A1* | 3/2011 | Kuang | .................. | G06F 9/4403 713/2 |
| 2011/0072423 A1* | 3/2011 | Fukata | ....................... | G06F 8/65 717/172 |
| 2011/0106886 A1* | 5/2011 | Nolterieke | ................. | G06F 8/65 709/204 |
| 2011/0173604 A1* | 7/2011 | Nakamura | ................ | G06F 8/63 717/173 |

(Continued)

*Primary Examiner* — Insun Kang
(74) *Attorney, Agent, or Firm* — Fogarty LLP (57) ABSTRACT

Embodiments of systems and methods for reducing Keyboard, Video, and Mouse (KVM) downtime during firmware update or failover events are discussed. In some embodiments, a chassis may include: a plurality of Information Handling Systems (IHSs); a first Enclosure controller (EC); and a second EC coupled to the first EC, where the first and second ECs comprise program instructions stored thereon that, upon execution, cause the chassis to: establish a KVM session with a selected IHS via the first EC; in response to the first EC receiving a firmware update command, update and restart the second EC; notify the first EC, by the second EC, that the update and restart is completed; trigger by a first KVM process in the first EC, a second KVM process in the second EC; and take control, by the second EC, of the KVM session.

19 Claims, 5 Drawing Sheets

(56) References Cited

U.S. PATENT DOCUMENTS

| | | | | |
|---|---|---|---|---|
| 2012/0260242 | A1* | 10/2012 | Nguyen | G06F 8/656 |
| | | | | 717/168 |
| 2013/0191576 | A1* | 7/2013 | Chiang | G06F 8/654 |
| | | | | 710/305 |
| 2013/0191821 | A1* | 7/2013 | Armstrong | G06F 11/20 |
| | | | | 717/171 |
| 2013/0268922 | A1* | 10/2013 | Tiwari | G06F 9/4411 |
| | | | | 717/168 |
| 2017/0075676 | A1* | 3/2017 | Li | G06F 8/71 |
| 2017/0161054 | A1* | 6/2017 | Albot | G06F 12/109 |
| 2017/0277530 | A1* | 9/2017 | Adams | G06F 12/10 |
| 2017/0357497 | A1* | 12/2017 | Lin | G06F 8/65 |
| 2018/0081675 | A1* | 3/2018 | Sundaresh | G06F 9/4406 |
| 2018/0136928 | A1* | 5/2018 | Downum | G06F 8/654 |
| 2018/0157475 | A1* | 6/2018 | Dailey | G06F 8/65 |
| 2018/0165082 | A1* | 6/2018 | Batchelor | H04L 67/34 |
| 2018/0285123 | A1* | 10/2018 | Kumar | G06F 13/385 |
| 2018/0321933 | A1* | 11/2018 | Kondapi | G06F 15/177 |
| 2019/0179554 | A1* | 6/2019 | Pioch | G06F 3/0617 |
| 2019/0361694 | A1* | 11/2019 | Gordon | G06F 9/452 |
| 2019/0361695 | A1* | 11/2019 | Gore | G06F 8/65 |
| 2020/0082090 | A1* | 3/2020 | Samuel | G06F 21/575 |

\* cited by examiner

SYSTEMS AND METHODS FOR REDUCING KEYBOARD, VIDEO, AND MOUSE (KVM) DOWNTIME DURING FIRMWARE UPDATE OR FAILOVER EVENTS IN A CHASSIS WITH REDUNDANT ENCLOSURE CONTROLLERS (ECS)

FIELD

The present disclosure generally relates to Information Handling Systems (IHSs), and, more particularly, to systems and methods for reducing Keyboard, Video, and Mouse (KVM) downtime during firmware update or failover events in a chassis with redundant Enclosure Controllers (ECs).

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are often installed within a chassis or rack. In some cases, it is possible to use the same keyboard, video, and mouse (KVM) to interact with any given one of several IHSs in a chassis, one at a time, under control of redundant Enclosure Controllers (ECs) or Chassis Management Controllers (CMCs).

SUMMARY

Embodiments of systems and methods for reducing Keyboard, Video, and Mouse (KVM) downtime during firmware update or failover events in a chassis with redundant Enclosure Controllers (ECs) are described. In an illustrative, non-limiting embodiment, a chassis may include a plurality of Information Handling Systems (IHSs); a first EC; and a second EC coupled to the first EC, where the first and second ECs comprise program instructions stored thereon that, upon execution, cause the chassis to: establish a KVM session with a selected IHS via the first EC; in response to the first EC receiving a firmware update command, update and restart the second EC; notify the first EC, by the second EC, that the update and restart is completed; trigger by a first KVM process in the first EC, a second KVM process in the second EC; and take control, by the second EC, of the KVM session.

Prior to establishing the KVM session via the first EC, the first EC may be in an active state and the second EC may be in a standby state. The program instructions upon execution, may cause the chassis to update and restart the second EC prior to updating the first EC. For the first EC to establish the KVM session, the program instructions, upon execution, may cause the chassis to output video from the first EC via a DisplayPort multiplexer. Moreover, for the second EC to take control of the KVM session, the program instructions, upon execution, may cause the chassis to output video from the second EC via the DisplayPort multiplexer. When the second EC restarts, the first EC may enter the standby state and the second EC may enter the active state.

In some cases, the program instructions, upon execution, may cause the chassis to: in response to second first EC having received another firmware update command, update and restart the first EC; notify the second EC, by the first EC, that the update and restart is completed; trigger by a second KVM process in the second EC, a first KVM process in the first EC; and take control, by the first EC, of the KVM session.

When the first EC restarts, the first EC may reenter the active state and the second EC may reenter the standby state. For the first EC to take control of the KVM session, the program instructions, upon execution, may cause the chassis to output video from the first EC via the DisplayPort multiplexer.

In another illustrative, non-limiting embodiment, a hardware memory may be coupled to a first EC and to a second EC of a chassis, where the chassis is configured to manage a plurality of Information Handling Systems (IHSs) coupled thereto, and where hardware memory has program instructions stored thereon that, upon execution, cause the chassis to: establish a KVM session with a selected IHS via the first EC; monitor, by the second EC, a heartbeat of the first EC; and in response to a heartbeat miss, take control of the KVM session by the second EC.

Prior to establishing the KVM session via the first EC, the first EC may be in an active state and the second EC may be in a standby state. For the first EC to establish the KVM session, the program instructions, upon execution, may cause the chassis to output video from the first EC via a DisplayPort multiplexer. Additionally, or alternatively, for the second EC to take control of the KVM session, the program instructions, upon execution, may cause the chassis to output video from the second EC via the DisplayPort multiplexer. Additionally, or alternatively, for the second EC to take control of the KVM session, the program instructions, upon execution, may cause the second EC to begin outputting the video prior to cluster transition being complete. In some cases, the heartbeat miss may be detected in response to the first EC having been physically removed from the chassis.

In yet another illustrative, non-limiting embodiment, a method may include establishing a KVM session with a selected IHS via the first EC; in response to the first EC receiving a firmware update command, update and restart the second EC; notifying the first EC, by the second EC, that the update and restart is completed; triggering by a first KVM process in the first EC, a second KVM process in the second EC; taking control, by the second EC, of the KVM session; and in response to the second EC being physically removed from the chassis, taking control of the KVM session by the first EC.

Prior to establishing the KVM session via the first EC, the first EC may be in an active state and the second EC may be in a standby state. After establishing the KVM session via the second EC, the first EC may be in the standby state and the second EC may be in the active state.

In some cases, establishing the KVM session with the first EC may include outputting video from the first EC via a DisplayPort multiplexer. Moreover, taking control of the KVM session with the second EC may include outputting video from the second EC via the DisplayPort multiplexer.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

In various embodiments, systems and methods described herein enable Keyboard-Video-Mouse (KVM) sessions across multiple IHSs using redundant Enclosure Controllers (ECs) or Chassis Management Controllers (CMCs) of a chassis or rack. Particularly, each EC or CMC of cluster may be configured to: (i) receive keyboard and mouse inputs from a user operating the chassis during a KVM session (e.g., desktop sharing or the like) and transmit those inputs to a target IHS in the chassis; and (ii) receive graphics produced by the target IHS to the client IHS during the KVM session.

With respect to KVM technologies, virtual KVM (vKVM) is a software application that enables video, keyboard, and mouse redirection in Baseboard Management Controllers (BMCs) and other service processors. To use vKVM, a client IHS installs browser plugins (e.g., "Active X" or "Java") or uses Hypertext Markup Language (HTML) web sockets, to access the video output of a target IHS over a network. Protocols that support vKVM include, but are not limited to, Dambrackas Video Compression (DVC), American Megatrend's (AMI's) Advanced Adaptive Video Compression Algorithm (AAVICA), etc.

Another example of KVM technology in use today is Virtual Network Computing (VNC), which uses the Remote Frame Buffer protocol (RFB). A VNC client transmits keyboard and mouse events from the client IHS to the target IHS, relaying graphical screen updates back in the other direction, over a network. Yet other KVM technologies include the Remote Desktop Protocol (RDP) and other proprietary and Original Equipment Manufacturer (OEM) protocols (e.g., such as Integrated Lights-Out or "iLO", etc.).

Various embodiments described herein may be implemented in ECs or CMCs. In some implementations, an EC may include a processor core, a graphics core, and a memory. The graphics core may be coupled to the processor core via an Advanced Microcontroller Bus Architecture (AMBA) high-performance bus (AHB)-to-Peripheral Component Interconnect (PCI) (AHB-to-PCI) bridge. For example, the processor core may be an ARM core and the graphics core may be a Matrox Graphics Inc. (MGA) core.

In many cases, a dual-EC chassis may be employed that provides a redundancy subsystem with High Availability (HA) capabilities for installations by deploying a pair of EC units in a chassis. A chassis with 2 EC units installed has the benefit of a more resilient management infrastructure.

Because both ECs have access to the chassis' hardware including General Programmable Input/Ouptut ports (GPIOs), Field Programmable Gate Arrays (FPGAs), and buses (e.g., I2C and supershifty), only one EC is permitted to access that hardware at any one time. All processes that require hardware access are in active mode on one EC, and in standby mode on the other EC. Processes that do not access hardware, however, may operate in active mode on either node. Configuration of the cluster management infrastructure includes settings and rules that control the relationships between processes and permitted cluster states.

As used herein, the term "active" refers to the cluster state of an EC node (and processes running on that node) that has control of shared hardware, and the term "standby" refers to the cluster state of the EC node that does not. Processes running on the standby node may be carrying out processing activities but cannot access shared hardware until they are instructed to switch to active mode. The process of switching between active and standby states is referred to as a cluster transition.

In a dual-EC chassis, there are two EC processors executing the same firmware stack; however, only the Active EC has access to the chassis hardware to deliver EC functionality. The processes that access hardware while running within active EC are made cluster-aware, so that they can decide to transition from active to standby when any failure occurs.

A KVM background daemon (eckvmbd) is a cluster-aware process that uses DisplayPort (DP). It gets notified when there is failure, and it transitions to the Standby EC once a DP multiplexer (mux) is switched to standby. This whole transition takes time, which causes ongoing KVM sessions to go offline during the failover time. In various embodiments, systems and methods described reduce this amount of time.

In some embodiments, a capability available to processes that can help shorten this failover time is the synchronization of specific data from the active node to the standby node. In some implementations, data synchronization may be performed, for example, utilizing Dell Function Server (DFS) and Dell Notification Management Service (DNMS) components and features.

Particularly, certain types of data such as inventory data may be copied from the active to the standby whenever it is updated. When a failover event occurs, the standby processes may shorten the time required to acquire certain data prior to processing client requests and hardware events. All processes/daemons may ensure they have accurate and complete data on start up. In most cases, synchronizing the data between nodes can make it quicker to verify the current state, for example, than completely rebuilding the current state.

BMC components on the IHSs, blades, or sleds mounted on the chassis communicate with the active EC. This communication is handled by DFS, which maintains a set of aliases for each EC and BMC. Using the alias "ec.active," for example, a BMC can direct a request to whichever EC is currently active.

As used herein, the term "framebuffer" refers to a portion of memory containing a bitmap that drives a video display—that is, is a memory buffer containing at least one complete frame of data. The information in a framebuffer may include color values for every pixel to be shown on a display. Color values are commonly stored in any suitable number of bits. In some cases, an alpha channel may provide additional information about pixel transparency. The amount of memory required for a framebuffer depends upon the resolution of the video frames as well as on color depth and/or palette. In many implementations, a software framebuffer, such as fbdev in Linux, may emulate the operation of a hardware framebuffer by abstracting the physical method for accessing the underlying device into a memory map.

Figure 1A:
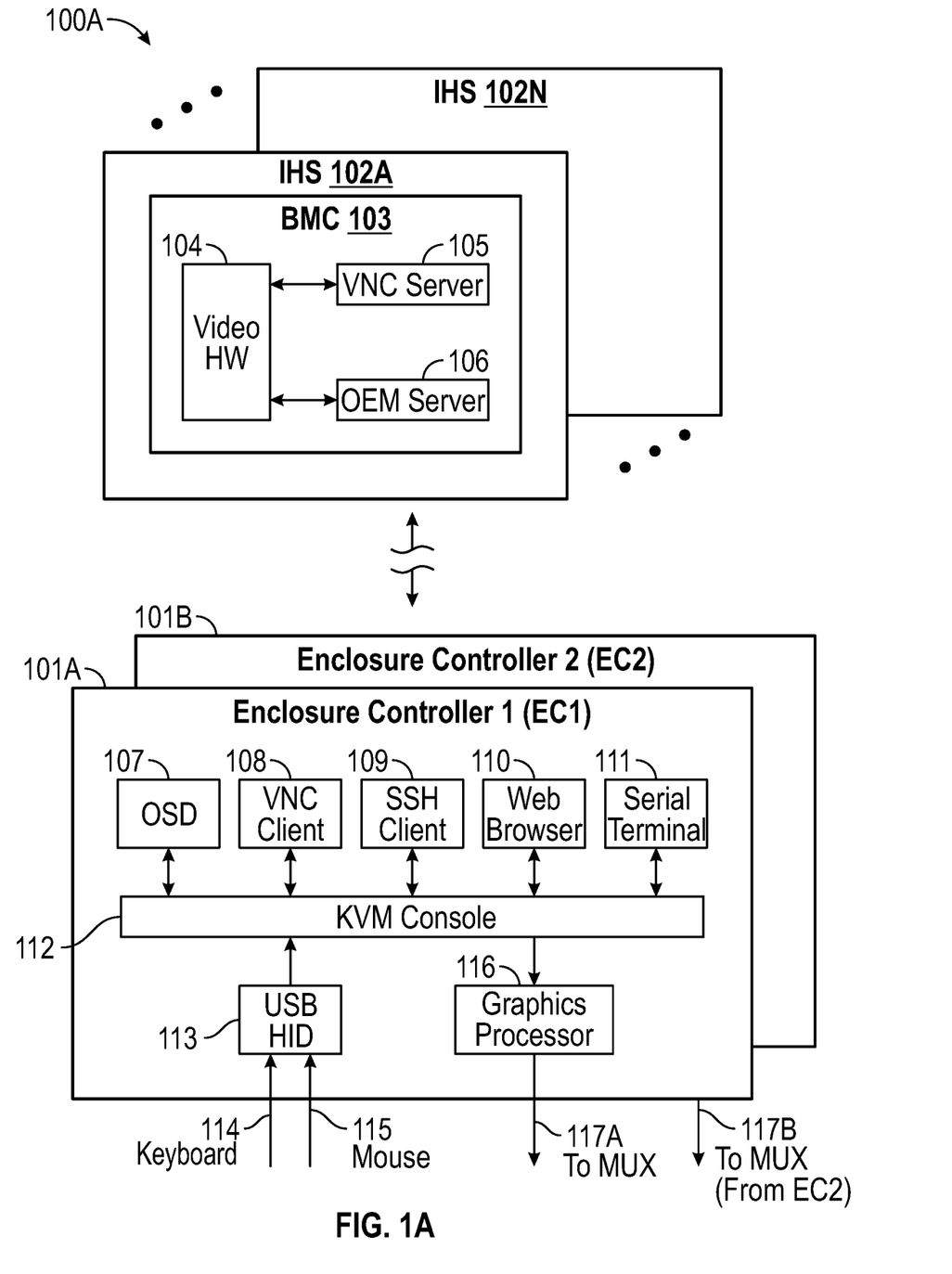
FIG. 1A is a diagram illustrating systems and methods for reducing Keyboard, Video, and Mouse (KVM) downtime during firmware update or failover events in a chassis with redundant Enclosure Controllers (ECs), according to some embodiments.

FIG. 1A is a diagram illustrating a system for reducing KVM downtime during firmware update or failover events in a chassis with dual or redundant ECs. Particularly, chassis 100A comprises first Enclosure Controller (EC1) 101A and second EC (EC2) 101B, which can be two distinct instances of the same controller or management module. (A more detailed diagram of chassis 100A is provided in FIG. 3.) The first and second ECs 101A-B are directly coupled to each other, and are also in communication with a plurality of IHSs 102A-N (e.g., blades or sleds). In this implementation, a user or administrator interacts with the presently active EC (e.g., using "ec.active") via KVM console 112, which provides a graphical user interface (GUI) or the like.

EC1 101A also executes one or more of: on-screen display (OSD) module 109, VNC client 110, Secure Shell (SSH) client 111, web browser 112, and/or serial terminal 113. (Redundant EC2 101B executes independent instances of like components.) One or more of these components may be configured to receive a video signal from a corresponding IHS 102A-N. For example, VNC client 110 in EC1 101A may establish a connection with VNC server 105 of BMC 103 to enable a KVM session with IHS 102A.

Each of the plurality of IHSs 102A-N includes its own BMC 103. BMC 103 in turn includes video hardware 104 (e.g., an integrated video core) and executes VNC server 105 and/or OEM server 106, each configured to output a video signal during a video redirection session using a respective protocol (e.g., RFB, proprietary, etc.).

In operation, Universal Serial Bus (USB) Human Interface Device (HID) module 113 capture keyboard 114 and/or mouse 115 events, and relays those events to a selected one of IHSs 102A-N. The user visually interacts with the selected IHS 102 using a local display configured to a render video signal.

Specifically, EC1 101A provides video redirection for video content produced by video hardware 104 in selected IHS 102 to video port 117A (e.g., VGA, DisplayPort, HDMI, etc.). To output video through port 117A, KVM console 112 may send a command to graphics processor or core 116 to scrape a framebuffer memory directly or by operation of a host CPU's PCI bus. Ports 117A-B are coupled to a DisplayPort multiplexer (MUX) shown in FIGS. 1B and 1C.

Figure 1B:
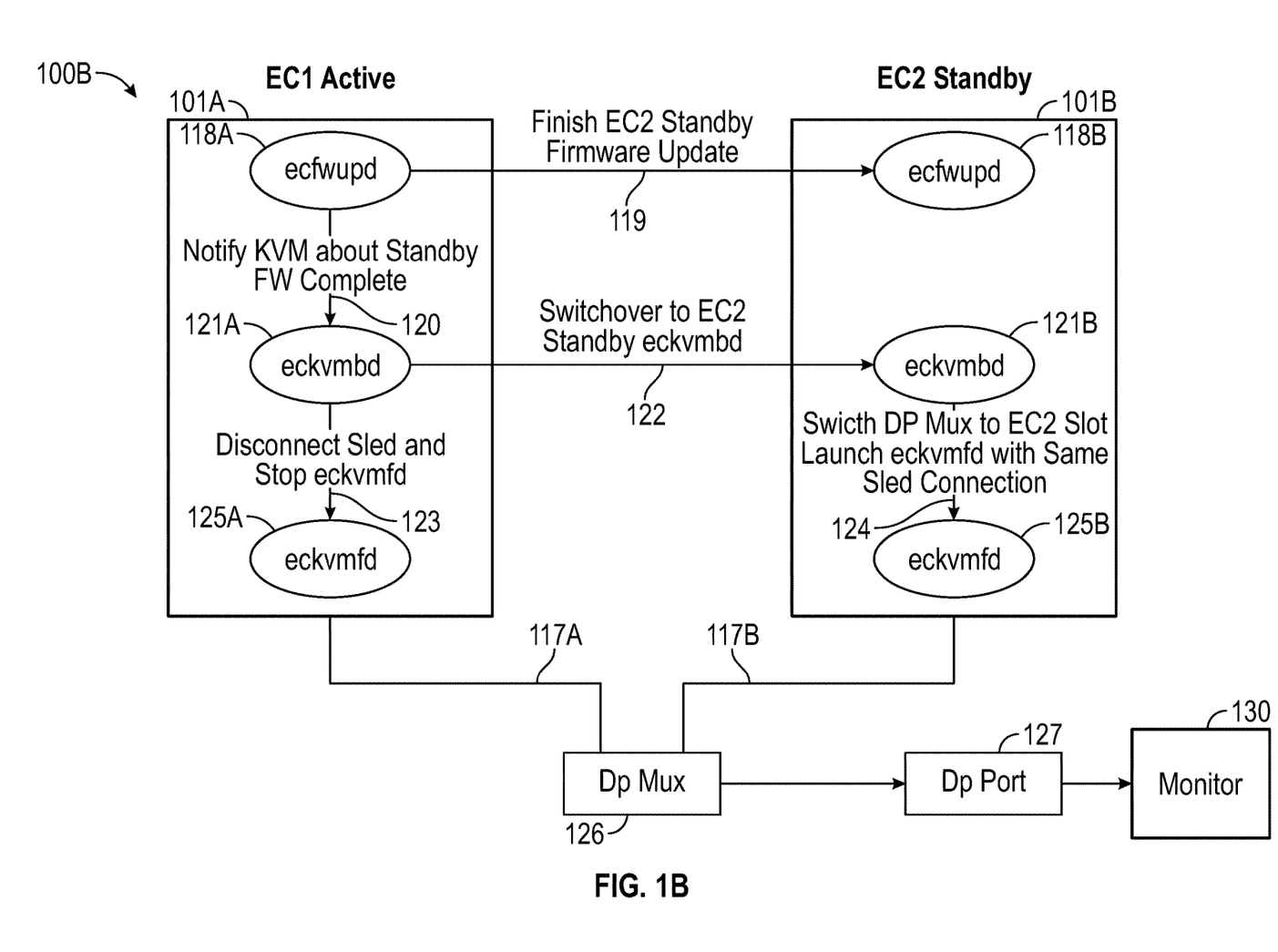
FIG. 1B is a diagram illustrating a method for reducing KVM session downtime during an EC firmware update event, according to some embodiments.

FIG. 1B is a diagram illustrating method 100B for reducing KVM session downtime during an EC firmware update event. In some embodiments, method 100B may be performed by firmware components between EC1 101A and EC2 101B executed in cooperation. At the outset, EC1 101A is active and EC2 101B in on standby.

Assume that at least one KVM session is ongoing between EC1 101A and a selected IHS, such that EC1 101A outputs video from the IHS via port 117A to DP mux 126. In some cases, DP mux 126 may be implemented in an FPGA, or the like. DP mux 126 receives video from one of its two inputs 117A or 117B, selects one, and provides it to DP port 127, which outputs video from the selected IHS to monitor or display device 130 for rendering to the user or administrator In a firmware update scenario, once EC1 101A receives a firmware update command, a first cluster hardware daemon 118A (fwupd) sends message 119 updating a corresponding second daemon 118B in EC2 101B. In response, EC2 102B updates its own firmware and restarts, still in standby mode. First daemon 118A sends message 120 to update a second cluster hardware daemon 121A in EC1 101A (eckvmbd, a KVM background process) about the progress or completion of the firmware update process of standby EC2 101B.

Immediately upon receiving message 120, second daemon 121A of active EC1 101A sends message 122 to its counterpart daemon 121B in standby EC2 101B to start a KVM session with the same IHS selected in the ongoing KVM session.

Daemon 121B of EC2 101B, upon receiving message 122 from daemon 121B, switches the input of DP mux 126 from 117A to 117B, takes control of the RCP stream, and starts running daemon 125B (eckvmfd, a KVM foreground process) connected to same sled—thereby resuming the KVM session. Meanwhile, daemon 121A sends message 123 daemon 125A to disconnect the sled and stop the session by EC1 101A.

In some implementations, method 100B may save KVM session downtime (e.g., EC2 Standby to EC2 Active transition). It should be noted that the entire method 100B may be performed while EC1 is still active, therefore the KVM session may be switched much before the entire cluster transition is completed.

Figure 1C:
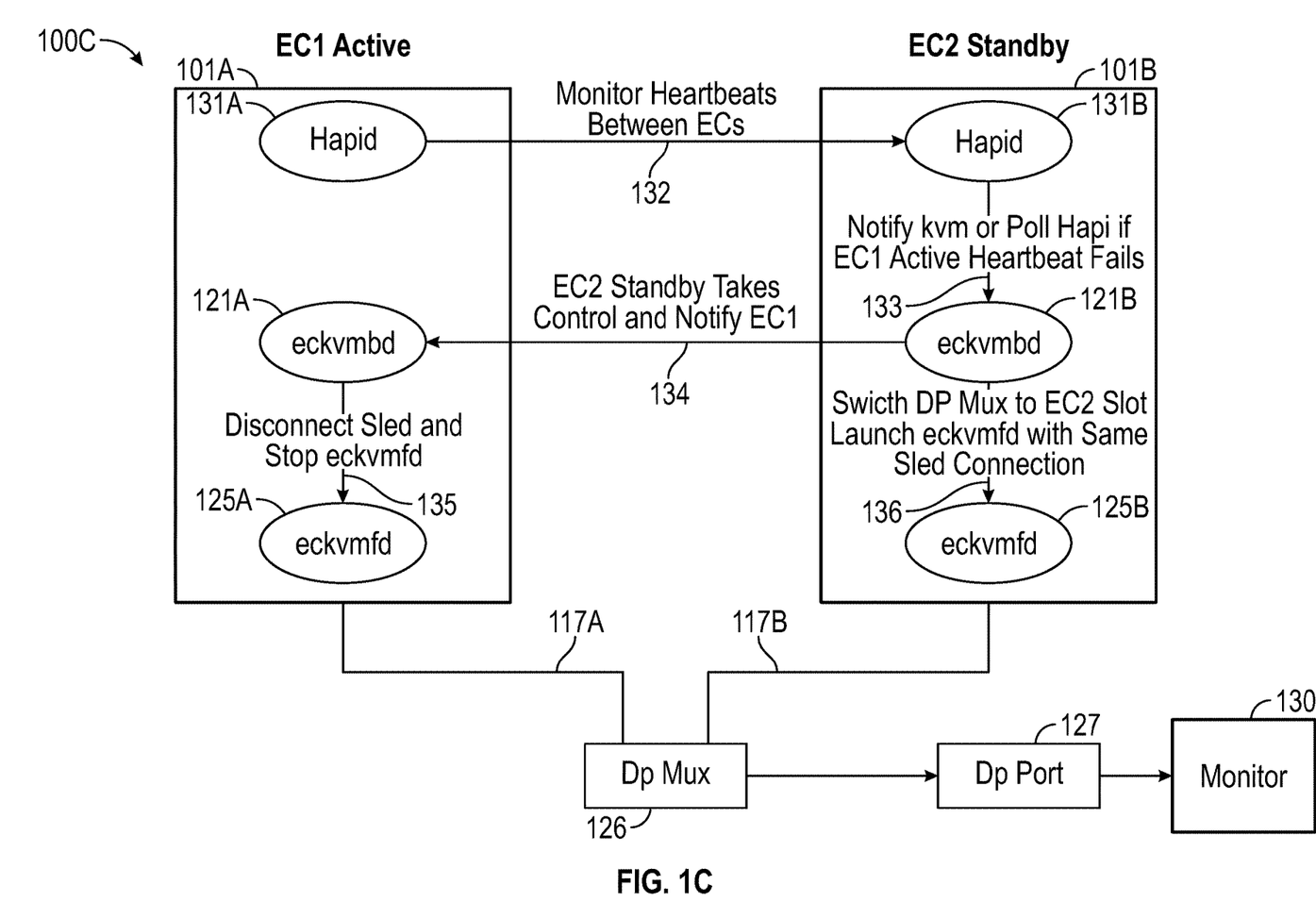
FIG. 1C is a diagram illustrating a method for reducing KVM session downtime during an EC failover event, according to some embodiments.

FIG. 1C is a diagram illustrating method 100C for reducing KVM session downtime during an EC failover event. In some embodiments, method 100C may be performed by firmware components between EC1 101A and EC2 101B executed in cooperation.

Again, at the outset, EC1 101A is active and EC2 101B in on standby. At least one KVM session is ongoing between EC1 101A and a selected IHS, such that EC1 101A outputs video from the IHS via port 117A to DP mux 126.

In this state, active EC1 101A's eckvmbd 121A and standby EC2 101B's eckvmbd 121B process are synchronized. For example, a first heartbeat process 131A in active EC1 101A may exchange heartbeat signals 132 with a second heartbeat process 131B in active EC2 101B.

If EC1 101A fails for any reason, one or more of signals 132 may also fail (e.g., there is a miss), heartbeat process 131B sends a message to eckvmbd 121B, in active EC2 101B to notify it of EC1 101A's failure.

Immediately upon receiving message 133, eckvmbd 121B of standby EC2 101B takes control of the KVM session, without having to wait for the cluster transition to start (or be completed). Eckvmbd 121B also issues command 136 of to launch eckvmfd process 125B with the same selected IHS, and to switch the input of DP mux 126 from 117A to 117B.

Eckvmbd 121B of EC2 102B further sends message 134 to eckvmbd 121A of EC1 102A that it is taking control of the KVM session. In response eckvmbd 121A sends command 135 to daemon 125A to disconnect the IHS and stop its own KVM session.

Accordingly, method 100C can avoid downtime during a failover scenario. Moreover, method 100C is particularly applicable to situations where the presently active EC (EC1 or EC2) is instantly physically removed from the chassis (e.g., user mistake or intrusion).

Figure 2:
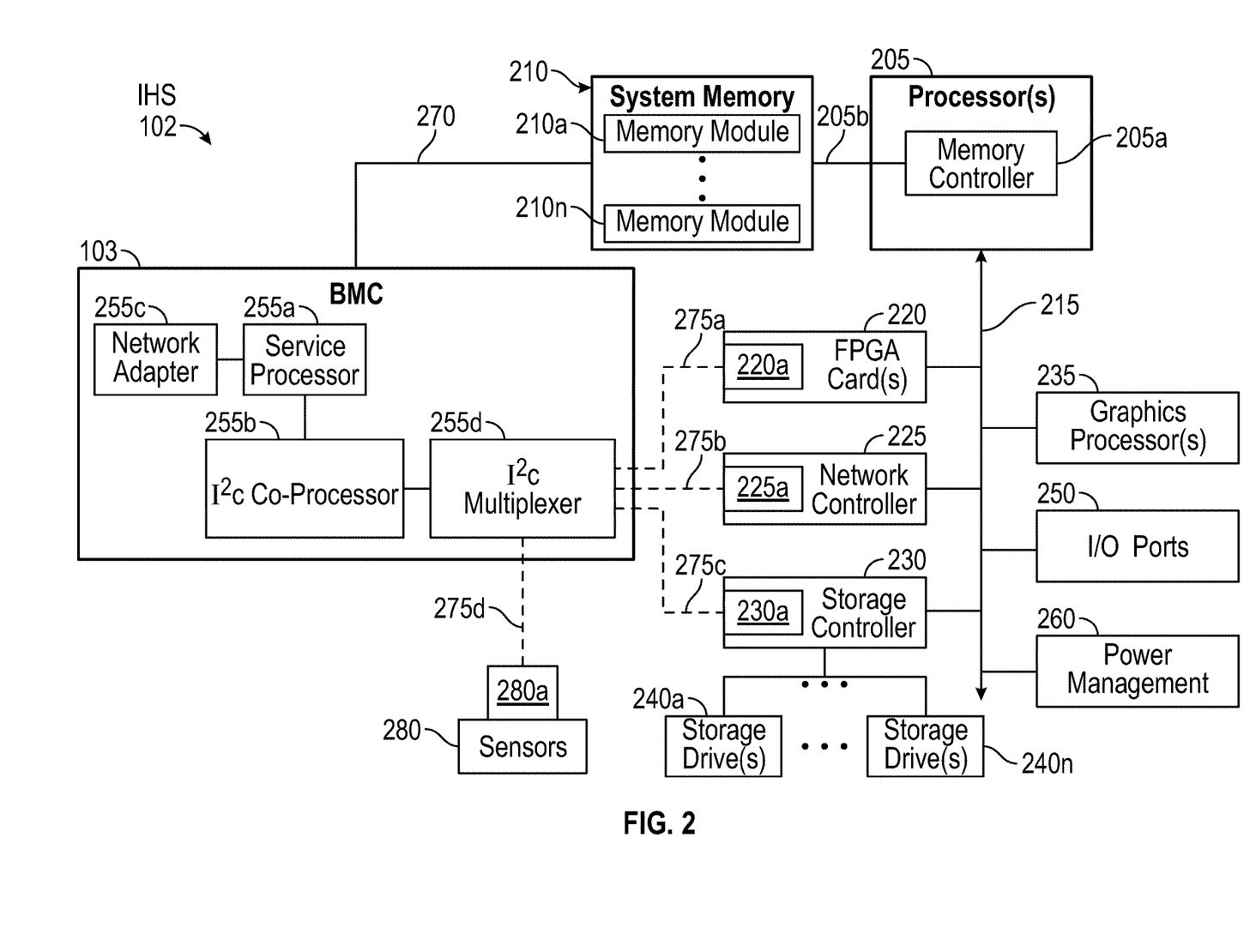
FIG. 2 is a diagram illustrating components of an Information Handling System (IHS), according to some embodiments.

FIG. 2 shows an example of an IHS 102 configured to implement systems and methods described herein. In some implementations, IHS 102 may be a computing component, such as a sled or blade, configured to share infrastructure resources provided by a chassis, for example, as shown in FIG. 9 (e.g., 905a-n and/or 915a-n). It should be appreciated, however, that although these embodiments show an IHS as sled or blade, other IHS implementations may be utilized including, but not limited to: desktops, laptops, appliances, and mobile devices, etc.

In some embodiments, processor(s) 205 may include a main processor and a co-processor, each of which may include a plurality of processing cores that, in certain scenarios, may each be used to run an instance of a server. In certain embodiments, one or all of processor(s) 205 may be graphics processing units (GPUs) in scenarios where IHS 102 has been configured to support functions such as multimedia services and graphics applications.

As illustrated, processor(s) 205 includes integrated memory controller 205a that may be implemented directly within the circuitry of processor 205, or memory controller 205a may be a separate integrated circuit that is located on the same die as processor 205. Memory controller 205a may be configured to manage the transfer of data to and from system memory 210 of IHS 102 via high-speed memory interface 205b.

System memory 210 is coupled to processor(s) 205 via memory bus 205b that provides processor(s) 205 with high-speed memory used in the execution of computer program instructions. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, system memory 210 may be include multiple removable memory modules. System memory 210 includes removable memory modules 210a-n. Each of removable memory modules 210a-n may correspond to a printed circuit board memory socket that receives corresponding module 210a-n, such as a DIMM (Dual In-line Memory Module), that can be coupled to the socket and then decoupled from the socket as needed, such as to upgrade memory capabilities or to replace faulty components. In other embodiments of IHS, system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 102 may utilize a chipset implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 102 may also include one or more I/O ports 250, such as PCIe ports, that may be used to couple the IHS 102 directly to other IHSs, storage resources or other peripheral components.

As illustrated, a variety of resources may be coupled to processor(s) 205 of IHS 102 via bus 215. For instance, processor(s) 205 may be coupled to network controller 225, such as provided by a Network Interface Controller (NIC) that is coupled to IHS 102 and allows IHS 102 to communicate via an external network, such as the Internet or a LAN. Processor(s) 205 may also be coupled to power management unit 260 that may interface with (the power system unit of a chassis) in which IHS 102 may be installed as a sled or blade. In certain embodiments, graphics processor 235 may be included within one or more video or graphics cards, or an embedded controller, installed as components of IHS 102. In certain embodiments, graphics processor 235 may be an integrated part of BMC 103 and may be utilized to support the display of diagnostic and administrative interfaces related to IHS 102 via display devices that are coupled, either directly or remotely, to BMC 103.

As illustrated, IHS 102 may include one or more FPGA (Field-Programmable Gate Array) card(s) 220. Each of FPGA card(s) 220 supported by IHS 102 may include various processing and memory resources, in addition to an FPGA integrated circuit that may be reconfigured after deployment of IHS 102 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 102.

In certain embodiments, IHS 102 may operate using a Basic Input/Output System (BIOS) that may be stored in a non-volatile memory accessible by processor(s) 205. The BIOS may provide an abstraction layer by which the operating system (OS) of the IHS 102 interfaces with its hardware components. Upon powering or restarting IHS 102, processor(s) 205 may utilize BIOS instructions to initialize and test hardware components, including both components permanently installed as components of the motherboard of IHS 102 and removable components installed within various expansion slots supported by the IHS 102. The BIOS instructions may also load an OS. In certain embodiments, IHS 102 may utilize Unified Extensible Firmware Interface (UEFI) in addition to or instead of a BIOS. In certain embodiments, the functions provided by a BIOS may be implemented, in full or in part, by BMC 103.

In certain embodiments, BMC 103 may operate from a different power plane from processor(s) 205 and other components of IHS 103, thus allowing BMC 103 to operate, and management tasks to proceed, while the processing cores of IHS 103 are powered off. As described, various functions provided by the BIOS, including launching the OS of IHS 103, may be implemented by BMC 103. In some embodiments, BMC 103 may perform various functions to verify the integrity of IHS 103 and its hardware components prior to initialization (e.g., in a bare-metal state).

BMC 103 may include service processor 255a, or specialized microcontroller, that operates management software that supports remote monitoring and administration of IHS 102. BMC 103 may be installed on the motherboard of IHS 102 or may be coupled to IHS 102 via an expansion slot provided by the motherboard. In support of remote monitoring functions, network adapter 255c may support connections with BMC 103 using wired and/or wireless network connections via a variety of network technologies.

As a non-limiting example of a BMC, the integrated Dell BMC (iDRAC) from Dell® is embedded within Dell PowerEdge™ servers and provides functionality that helps information technology (IT) administrators deploy, update, monitor, and maintain servers remotely.

In some embodiments, BMC 103 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of I2C multiplexer 255d of BMC 103. As illustrated, certain of the managed devices of IHS 102, such as FPGA cards 220, network controller 225 and storage controller 230, are coupled to the IHS processor(s) 205 via in-line bus 215, such as a PCIe root complex, that is separate from the I2C sideband bus connections 275a-d used for device management. The management functions of BMC 103 may utilize information collected by various managed sensors 280 located within the IHS. For instance, temperature data collected by sensors 280 may be utilized by BMC 103 in support of closed-loop airflow cooling of the IHS 102.

In certain embodiments, the service processor 255a of BMC 103 may rely on an I2C co-processor 255b to implement sideband I2C communications between BMC 103 and managed components 220, 225, 230, 280 of the IHS. The I2C co-processor 255b may be a specialized co-processor or micro-controller that is configured to interface via a sideband I2C bus interface with the managed hardware components 220, 225, 230, 280 of IHS. In some embodiments, I2C co-processor 255b may be an integrated component of service processor 255a, such as a peripheral system-on-chip feature that may be provided by service processor 255a.

Each I2C bus 275a-d is illustrated as a single line in FIG. 2. However, in various implementations, each I2C bus 275a-d may include of a clock line and data line that couple BMC 103 to I2C endpoints 220a, 225a, 230a, 280a which may be identified as modular field replaceable units (FRUs).

In various scenarios, a portion of managed devices 220, 225, 230, 280 may support I2C bus 275a-d communications that utilize IPMI (Management Component Transport Protocol) messaging. For instance, certain types of legacy and less-sophisticated managed devices, such as temperature sensors 280, may utilize IPMI messaging and may thus be identified on the I2C bus 275d as an IPMI endpoints by the I2C coprocessor 255b. IHS 102 may include a variety of IPMI sensors 280 that collect various types of readings, such as intrusion detection and power consumption.

In providing sideband management capabilities, I2C coprocessor 255b may each interoperate with corresponding endpoint I2C controllers 220a, 225a, 230a, 280a that implement the I2C communications of respective managed devices 220, 225, 230. Endpoint I2C controllers 220a, 225a, 230a, 280a may be implemented as a dedicated microcontroller for communicating sideband I2C messages with BMC 103, or endpoint I2C controllers 220a, 225a, 230a, 280a may be integrated SoC functions of a processor of the respective managed device endpoints 220, 225, 230, 280.

In various embodiments, IHS 102 does not include each of the components shown in FIG. 2. In various embodiments, IHS 102 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into one or more processor(s) 205 as a systems-on-a-chip (SoC).

IHS 102 of FIG. 2 may be a compute sled, such as compute sleds 305a-n of FIG. 3 below, that may be installed within a chassis, that may in turn be installed within a rack. Installed in this manner, IHS 102 may utilized shared power, network and cooling resources provided by the chassis and/or rack.

Figure 3:
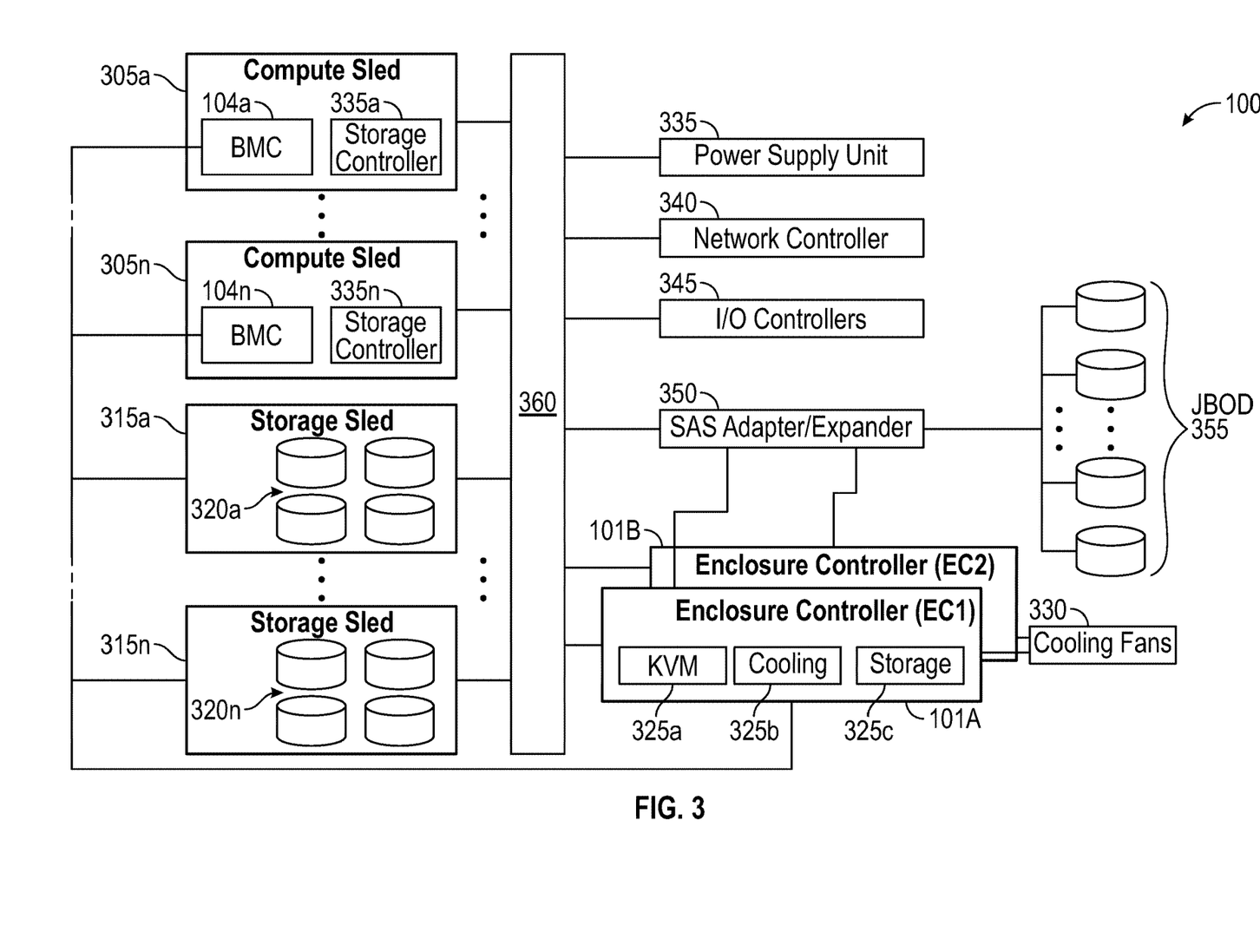
FIG. 3 is a diagram illustrating components of a chassis or rack, according to some embodiments.

FIG. 3 is a diagram illustrating components of a chassis or rack 100 comprising one or more compute sleds 305a-n and one or more storage sleds 315a-n that may be configured to implement the systems and methods described herein. Chassis 100 may include one or more bays that each receive an individual sled (that may be additionally or alternatively referred to as a tray, blade, and/or node), such as compute sleds 305a-n and storage sleds 315a-n. Chassis 100 may support a variety of different numbers (e.g., 4, 8, 16, 32), sizes (e.g., single-width, double-width) and physical configurations of bays.

Other embodiments may include additional types of sleds that provide various types of storage and/or processing capabilities. Other types of sleds may provide power management and networking. Sleds may be individually installed and removed from the chassis 100, thus allowing the computing and storage capabilities of a chassis to be reconfigured by swapping the sleds with different types of sleds, in many cases without affecting the operations of the other sleds installed in chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by compute sleds 305a-n and storage sleds 315a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack.

Chassis 100 may alternatively or additionally include one or more cooling fans 330 that may be similarly operated to ventilate heated air from within the sleds 305a-n, 315a-n installed within the chassis. A rack and chassis 100 installed within the rack may utilize various configurations and combinations of cooling fans to cool the sleds 305a-n, 315a-n and other components housed within chassis 100.

Sleds 305a-n, 315a-n may be individually coupled to chassis 100 via connectors that correspond to the bays provided by chassis 100 and that physically and electrically couple an individual sled to backplane 360.

Chassis backplane 360 may be a printed circuit board that includes electrical traces and connectors that are configured to route signals between the various components of chassis 100 that are connected to backplane 360. In various embodiments, backplane 360 may include various additional components, such as cables, wires, midplanes, backplanes, connectors, expansion slots, and multiplexers. In certain embodiments, backplane 360 may be a motherboard that includes various electronic components installed thereon. Such components installed on motherboard backplane 360 may include components that implement all or part of the functions described with regard to SAS (Serial Attached SCSI) expander 350, I/O controllers 345, network controller 340, and power supply unit 335.

In certain embodiments, compute sleds 305a-n may be IHSs such as described with regard to IHS 102 of FIG. 2. Compute sleds 305a-n may provide computational processing resources that may be used to support a variety of e-commerce, multimedia, business and scientific computing applications, such as services provided via a cloud implementation. Compute sleds 305a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 305a-n may be configured for general-purpose computing or may be optimized for specific computing tasks.

As illustrated, each compute sled 305a-n includes a respective BMC 310a-n. As described in additional detail with regard to FIG. 2, each BMC 310a-n provides capabilities for remote monitoring and management of its respective compute sled 305a-n. In support of these monitoring and management functions, BMCs 310a-n may utilize both in-band and sideband (i.e., out-of-band) communications with various components of a compute sled 305a-n and chassis 100. BMC 310a-n may collect sensor data, such as temperature sensor readings, from components of the chassis 100 in support of airflow cooling of the chassis 100 and the sleds 305a-n, 315a-n. In addition, each BMC 310a-n may implement various monitoring and administrative functions related to compute sleds 305a-n that require sideband bus connections with various internal components of the respective compute sleds 305a-n.

As described in above, BMCs 310a-n may provide capabilities support remote monitoring and managing of IHSs, such as compute sleds 305a-n.

As illustrated, chassis 100 also includes one or more storage sleds 315a-n that are coupled to backplane 360 and installed within one or more bays of chassis 100 in a similar manner to compute sleds 305a-n. Each of individual storage sleds 315a-n may include various different numbers and types of storage devices. For instance, storage sleds 315a-n may include SAS (Serial Attached SCSI) magnetic disk drives, SATA (Serial Advanced Technology Attachment) magnetic disk drives, solid-state drives (SSDs) and other types of storage drives in various combinations. Storage sleds 315a-n may be utilized in various storage configurations by compute sleds 305a-n that are coupled to chassis 100.

Each of compute sleds 305a-n includes storage controller 335a-n that may be utilized to access storage drives that are accessible via chassis 100. Some of the individual storage controllers 335a-n may provide support for RAID (Redundant Array of Independent Disks) configurations of logical and physical storage drives, such as storage drives provided by storage sleds 315a-n. In some embodiments, some or all of individual storage controllers 335a-n may be HBAs (Host Bus Adapters) that provide more limited capabilities in accessing physical storage drives provided via storage sleds 315a-n and/or via SAS expander 350.

In addition to the data storage capabilities provided by storage sleds 315a-n, chassis 100 may provide access to other storage resources that may be installed components of chassis 100 and/or may be installed elsewhere within a rack housing the chassis 100, such as within a storage blade. In certain scenarios, such storage resources 355 may be accessed via a SAS expander 350 that is coupled to backplane 360 of the chassis 100.

SAS expander 350 may support connections to a number of JBOD (Just a Bunch Of Disks) storage drives 355 that may be configured and managed individually and without implementing data redundancy across the various drives 355. Additional storage resources 355 may also be at various other locations within a datacenter in which chassis 100 is installed. Such additional storage resources 355 may also may be remotely located.

As illustrated, chassis 100 of FIG. 3 includes network controller 340 that provides network access to the sleds 305a-n, 315a-n installed within the chassis. Network controller 340 may include various switches, adapters, controllers and couplings used to connect chassis 100 to a network, either directly or via additional networking components and connections provided via a rack in which chassis 100 is installed.

Chassis 100 may similarly include power supply unit 335 that provides the components of the chassis with various levels of DC power from an AC power source or from power delivered via a power system provided by a rack within which chassis 100 may be installed. In certain embodiments, power supply unit 335 may be implemented within a sled that may provide chassis 100 with redundant, hot-swappable power supply units.

Chassis 100 may also include various I/O controllers 340 that may support various I/O ports, such as USB ports that may be used to support keyboard and mouse inputs and/or video display capabilities. Such I/O controllers 345 may be utilized by ECs 101A-B to support various KVM (Keyboard, Video and Mouse) 325a capabilities that provide administrators with the ability to interface with chassis 100 and or its individual blades. Each of ECs 101A-B may also include its own storage module 325c that provides capabilities for managing and configuring certain aspects of the storage devices of chassis 100, such as the storage devices provided within storage sleds 315a-n and within JBOD 355.

In addition to providing support for KVM 325a capabilities for administering chassis 100, each of ECs 101A-B may support various additional functions for sharing the infrastructure resources of chassis 100. In some scenarios, each of ECs 101A-B may implement tools for managing power 335, network bandwidth 340 and airflow cooling 330 that are available via the chassis 100. As described, airflow cooling 330 utilized by chassis 100 may include an airflow cooling system that is provided by a rack in which chassis 100 may be installed and managed by cooling modules 325*b* in each of ECs 101A-B.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A chassis, comprising:
   a plurality of Information Handling Systems (IHSs);
   a first Enclosure Controller (EC); and
   a second EC coupled to the first EC, wherein the first and second ECs comprise program instructions stored thereon that, upon execution, cause the chassis to:
   establish a Keyboard-Video-Mouse (KVM) session with a selected IHS of the IHSs via the first EC;
   in response to the first EC receiving a firmware update command, update and restart the second EC prior to updating the first EC;
   notify the first EC, by the second EC, that the update and restart is completed;
   trigger by a first KVM process for the KVM session in the first EC, a second KVM process for the KVM session in the second EC;
   take control, by the second EC, of the KVM session; and
   in response to the second EC being physically removed from the chassis, take control of the KVM session by the first EC.

2. The chassis of claim 1, wherein prior to establishing the KVM session via the first EC, the first EC is in an active state and the second EC is in a standby state.

3. The chassis of claim 1, wherein for the first EC to establish the KVM session, the program instructions, upon execution, further cause the chassis to output video from the first EC via a DisplayPort multiplexer.

4. The chassis of claim 3, wherein for the second EC to take control of the KVM session, the program instructions, upon execution, further cause the chassis to output video from the second EC via the DisplayPort multiplexer.

5. The chassis of claim 1, wherein when the second EC restarts, the first EC enters the standby state and the second EC enters the active state.

6. The chassis of claim 1, wherein the program instructions upon execution, further cause the chassis to: in response to second first EC having received another firmware update command, update and restart the first EC; notify the second EC, by the first EC, that the update and restart is completed; trigger by a third KVM process in the second EC, a fourth KVM process in the first EC; and take control, by the first EC, of the KVM session.

7. The chassis of claim 6, wherein when the first EC restarts, the first EC reenters the active state and the second EC reenters the standby state.

8. The chassis of claim 6, wherein for the first EC to take control of the KVM session, the program instructions, upon execution, further cause the chassis to output video from the first EC via the DisplayPort multiplexer.

9. A hardware memory coupled to a first Enclosure Controller (EC) and to a second EC of a chassis, wherein the chassis is configured to manage a plurality of Information Handling Systems (IHSs) coupled thereto, and wherein the hardware memory has program instructions stored thereon that, upon execution, cause the chassis to:
   establish a Keyboard-Video-Mouse (KVM) session with a selected IHS of the IHSs via the first EC coupled to the second EC;
   in response to the first EC receiving a firmware update command, update and restart the second EC prior to updating the first EC;
   notify the first EC, by the second EC, that the update and restart is completed;
   trigger by a first KVM process for the KVM session in the first EC, a second KVM process for the KVM session in the second EC;
   take control, by the second EC, of the KVM session; and
   in response to the second EC being physically removed from the chassis, take control of the KVM session by the first EC.

10. The hardware memory of claim 9, wherein prior to establishing the KVM session via the first EC, the first EC is in an active state and the second EC is in a standby state.

11. The hardware memory of claim 9, wherein for the first EC to establish the KVM session, the program instructions, upon execution, further cause the chassis to output video from the first EC via a DisplayPort multiplexer.

12. The hardware memory of claim 9, wherein for the second EC to take control of the KVM session, the program instructions, upon execution, further cause the chassis to output video from the second EC via the DisplayPort multiplexer.

13. The hardware memory of claim 12, wherein for the second EC to take control of the KVM session, the program instructions, upon execution, further cause the second EC to begin outputting the video prior to cluster transition being complete.

14. The hardware memory of claim 12, wherein a heartbeat miss is detected in response to the first EC having been physically removed from the chassis.

15. A method, comprising:
    establishing a Keyboard-Video-Mouse (KVM) session with a selected Information Handling System (IHS) of a plurality of IHSs via the first Enclosure Controller (EC) coupled to a second EC;
    in response to the first EC receiving a firmware update command, update and restart the second EC prior to updating the first EC;
    notifying the first EC, by the second EC, that the update and restart is completed;
    triggering by a first KVM process for the KVM session in the first EC, a second KVM process for the KVM session in the second EC;
    taking control, by the second EC, of the KVM session; and
    in response to the second EC being physically removed from the chassis, taking control of the KVM session by the first EC.

16. The method of claim 15, wherein prior to establishing the KVM session via the first EC, the first EC is in an active state and the second EC is in a standby state.

17. The method of claim 16, wherein after establishing the KVM session via the second EC, the first EC is in the standby state and the second EC is in the active state.

18. The method of claim 15, wherein establishing the KVM session with the first EC further comprises outputting video from the first EC via a DisplayPort multiplexer.

19. The method of claim 18, wherein taking control of the KVM session with the second EC further comprises outputting video from the second EC via the DisplayPort multiplexer.

* * * * *